(12) United States Patent
De Vries

(10) Patent No.: US 12,384,428 B2
(45) Date of Patent: Aug. 12, 2025

(54) TUBE SECTION FOR EVACUATED TUBE TRANSPORT SYSTEM

(71) Applicant: TATA STEEL NEDERLAND TECHNOLOGY B.V., Velsen-Noord (NL)

(72) Inventor: Paul Alexander De Vries, Velsen-Noord (NL)

(73) Assignee: TATA STEEL NEDERLAND TECHNOLOGY B.V., Velsen-Noord (NL)

( * ) Notice: Subject to any disclaimer, the term of this patent is extended or adjusted under 35 U.S.C. 154(b) by 796 days.

(21) Appl. No.: 17/753,892

(22) PCT Filed: Sep. 16, 2020

(86) PCT No.: PCT/EP2020/075825
§ 371 (c)(1),
(2) Date: Mar. 17, 2022

(87) PCT Pub. No.: WO2021/052991
PCT Pub. Date: Mar. 25, 2021

(65) Prior Publication Data
US 2022/0355830 A1    Nov. 10, 2022

(30) Foreign Application Priority Data

Sep. 18, 2019    (EP) ..................................... 19198139

(51) Int. Cl.
*B61B 13/10* (2006.01)
(52) U.S. Cl.
CPC .................................... *B61B 13/10* (2013.01)

(58) Field of Classification Search
CPC .......... B61B 13/08; B61B 13/10; B61B 13/12
See application file for complete search history.

(56) References Cited

U.S. PATENT DOCUMENTS

| | | | | |
|---|---|---|---|---|
| 1,020,942 | A * | 3/1912 | Bachelet ................ | H02K 41/03 104/282 |
| 5,950,543 | A * | 9/1999 | Oster ..................... | B61B 13/10 104/130.05 |
| 11,884,306 | B2 * | 1/2024 | Wyman ................. | B21C 37/155 |
| 2022/0355830 | A1 * | 11/2022 | De Vries ............... | B61B 13/10 |
| 2024/0102441 | A1 * | 3/2024 | Roberts ................. | F03G 3/08 |

FOREIGN PATENT DOCUMENTS

| | | | | |
|---|---|---|---|---|
| CN | 114423665 A | * | 4/2022 | ............ B61B 13/10 |
| EP | 0468099 A1 | * | 1/1992 | |
| ES | 2613360 T3 | * | 5/2017 | ........... B62D 21/152 |
| FR | 2854373 A1 | * | 11/2004 | ......... B63B 35/7976 |

(Continued)

OTHER PUBLICATIONS

International Search Report and Written Opinion mailed Dec. 22, 2020 for PCT/EP2020/075825 to Tata Steel Nederland Technology B.V. filed Sep. 16, 2020.

*Primary Examiner* — Jason C Smith
(74) *Attorney, Agent, or Firm* — Vorys, Sater, Seymour and Pease LLP; Anthony P. Venturino; Maryellen Feehery Hank

(57) ABSTRACT

A tube section for constructing a tube for underpressure applications with an incircle having a diameter of at least 2 m and to an evacuated tube transport system tube produced therefrom.

20 Claims, 8 Drawing Sheets

(56) References Cited

FOREIGN PATENT DOCUMENTS

| GB | 2579076 A | * | 6/2020 | ............. | B60R 19/54 |
|----|-----------|---|--------|---------------|------------|
| WO | WO-2016126505 A1 | * | 8/2016 | ............. | B61B 13/10 |
| WO | WO-2019149604 A1 | * | 8/2019 | ............. | B21C 37/15 |
| WO | WO-2019162068 A1 | * | 8/2019 | ............... | B32B 1/08 |
| WO | 2020169411 A1 | | 8/2020 | | |
| WO | WO-2023161678 A1 | * | 8/2023 | ............. | B61B 13/08 |
| WO | WO-2023161679 A1 | * | 8/2023 | ............. | B61B 13/08 |
| WO | WO-2023161682 A1 | * | 8/2023 | ............. | B61B 13/08 |
| WO | WO-2023161684 A1 | * | 8/2023 | ............. | B61B 13/08 |

* cited by examiner

4a: outer surface of the circumferential section

TUBE SECTION FOR EVACUATED TUBE TRANSPORT SYSTEM

CROSS-REFERENCE TO RELATED APPLICATIONS

This is a § 371 National Stage Application of International Application No. PCT/EP2020/075825 filed on Sep. 16, 2020, claiming the priority of European Patent Application No. 19198139.8 filed on Sep. 18, 2019.

FIELD OF THE INVENTION

This invention relates to a tube section for constructing a tube for underpressure applications with an incircle having a diameter of at least 2 m and to an evacuated tube transport system tube produced therefrom.

BACKGROUND OF THE INVENTION

With underpressure application is meant that the pressure in the tube is lower than outside the tube. The tube is therefore under external pressure. One such underpressure application is a tube in an evacuated tube transport system (ETT). A hyperloop is a proposed mode of ETT for passenger and/or freight transportation, first used to describe an open-source vactrain design released by a joint team from Tesla and SpaceX. Drawing heavily from Robert Goddard's vactrain, a hyperloop comprises a sealed vacuum tube or system of vacuum tubes through which a pod may travel with less or even free of air resistance or friction conveying people or objects at high speed and acceleration. Elon Musk's version of the concept, first publicly mentioned in 2012, incorporates reduced-pressure tubes in which pressurized capsules ride on air bearings driven by linear induction motors and air compressors. The tubes would run above ground on pylons or below ground in tunnels. The concept would allow travel which is considerably faster than current rail or air travel. An ideal hyperloop system will be more energy-efficient, quiet, and autonomous than existing modes of mass transit.

Developments in high-speed rail have historically been impeded by the difficulties in managing friction and air resistance, both of which become substantial when vehicles approach high speeds. The vactrain concept theoretically eliminates these obstacles by employing magnetically levitating trains in evacuated (airless) or partly evacuated tubes, allowing for very high speeds. The principle of magnetic levitation is disclosed in U.S. Pat. No. 1,020,942. However, the high cost of magnetic levitation and the difficulty of maintaining a vacuum over large distances has prevented this type of system from ever being built. The Hyperloop resembles a vactrain system but operates at approximately one millibar (100 Pa) of pressure and can therefore be described as an evacuated tube transport (ETT) system as disclosed in general terms in U.S. Pat. No. 5,950,543.

An ETT system solves many problems associated with classic transport by moving all obstacles from the path of travel. The object traveling (in this case a capsule) is in a tube so it stays on the intended path and no obstacles can get on the path. If subsequent capsules undergo identical acceleration and deceleration, many capsules can travel the same direction in the tube at once with complete safety. Acceleration and deceleration are planned to prevent the capsule from becoming an obstacle to subsequent capsules. The reliability of the capsules is very high due to minimal or no reliance on moving parts. Most of the energy required to accelerate is recovered during deceleration.

One of the important elements of an ETT-system is the tube. These tubes require a large internal diameter for allowing the pods containing the freight or passengers to pass through. The pressure in the tube is about 100 Pa, so it must be able to withstand the pressure from the surrounding atmosphere of about 101 kPa which is about 1000 times higher. As the tubes above ground would often be supported (e.g. by pylons) the tube must also be able to span the gap between two supports without bending or buckling. According to the full proposal of the Hyperloop Alpha project a tube wall thickness between 20 to 23 mm is necessary for a passenger tube to provide enough strength for the load cases considered such as pressure differential, bending and buckling between pylons, positioned about 30 m apart, loading due to the capsule weight and acceleration, as well as seismic considerations. For a passenger plus vehicle tube the tube wall thickness for the larger tube would be between 23 to 25 mm. These calculations are based on a tube having an internal diameter of 3.30 m. However, calculations have also shown that the economics of the ETT-system can be much improved by increasing the pod size travelling through the tube. These increased pod sizes require an internal diameter in the order of 3.50 to 5.00 meter. If these diameters of tube are produced from steel plate or strip, then this requires a thickness in the order of 30 mm. No hot strip mill can supply material of this thickness, and therefore these tubes would have to be produced from plate. With the proposed wide spread use of the ETT system and steel as the preferred material for the tube, this would require approx. 3000 ton/km×20000 km=60 Mton. Currently the total production of plate in EU28 is about 10 Mton/year. Apart from this capacity problem producing tubes from plate requires an enormous amount of cumbersome handling and shaping on-site and welding of the plate, as well as that the tubes become very heavy. A 5 m diameter tube of 30 mm thick steel weighs 3700 kg/m, meaning that segments of 10 m weigh 37 tonnes. The payload of a Mi-26 helicopter is about 22 tonnes. Transport via the road is impractical in view of viaducts or other restrictions.

Buckling refers to the loss of stability of a structure and in its simplest form, is independent of the material strength where it is assumed that this loss of stability occurs within the elastic range of the material. Slender or thin-walled structures under compressive loading are susceptible to buckling. So, the tube must not only be able to withstand the pressure difference and be able to span 30 m without significant sagging, it must also have enough buckling resistance. Using higher strength steels may increase the mechanical properties, and thereby lead to some material saving by allowing a thinner wall thickness, but not the buckling resistance.

WO2019162068 discloses an ETT system tube, comprising a plurality of tube segments consisting of a double-walled metal tube comprising an exterior metal tube and an interior metal tube, wherein the space between the exterior metal tube and the interior metal is filled with a stiffening compound, and wherein the stiffening compound bonds to and makes intimate contact with the interior surface of the exterior tube and with the exterior surface of the interior tube.

OBJECTIVES OF THE INVENTION

It is the object of the invention to provide a tube section for constructing a tube for underpressure applications that is lighter than a conventionally produced spiral-welded tube section, and which is not susceptible to buckling.

It is a further object of the invention to provide a tube section for constructing a tube for underpressure applications that can be produced on-site.

It is a further object of the invention to provide a tube section for constructing a tube for an ETT-system that can be transported over the road easily.

It is a further object of the invention to provide a tube suitable for an ETT-system which uses less material than a single skin tube while providing similar buckling performance with acceptable stiffness in a fashion that is conventionally manufacturable from hot- or cold-rolled strip steel.

DESCRIPTION OF THE INVENTION

One or more of these objects is reached with a tube section (2), having a length L, for constructing a tube (1) suitable for underpressure applications, with an incircle having a diameter of at least 2 m, wherein the tube section comprises a plurality of longitudinal stringers (3), a plurality of circumferential sections (4) and a plurality of skin sections (5) having a radius of curvature R and wherein the curvature extends along the entire length of the skin sections, wherein the longitudinal stringers (3) are connected to the outer surface (4a) of the circumferential sections (4), wherein the plurality of longitudinal stringers (3) are mounted to the circumferential sections to form a skeletal framework (6) for attaching the skin sections (5), wherein the long edges of the skin sections (5) are mounted air-tightly to the longitudinal stringers (3), and wherein the centre point M of the radius of curvature R of the skin sections (5) lies outside the tube section, and wherein, when the tube section is in use as an underpressure application, the skin sections between the longitudinal stringers (3) are loaded in tension between the longitudinal stringers (3). Preferable embodiments are provided in the dependent claims.

WO2020169411 discloses a tube section comprising a plurality of longitudinal stringers, a plurality of circumferential sections and a plurality of thin-walled skin sections having a radius of curvature R and wherein the curvature extends along the entire length of the thin-walled skin sections, wherein the longitudinal stringers are connected to the inner surface of the circumferential sections, wherein the longitudinal stringers and the circumferential sections form a skeletal framework for attaching the thin-walled skin sections (5) and wherein the long edges of the thin-walled skin sections (5) are mounted fixedly and air-tightly to the longitudinal stringers, and wherein, in use, the thin walled sections between the stringers are loaded in tension.

In the context of this invention "suitable for underpressure applications" means that the tube section, when used in an evacuated tube transport system tube comprising a plurality of tube sections according to the invention, is subjected to a pressure outside the tube or tube section of the atmospheric pressure and wherein the pressure inside the tube or tube section is less than 0.1 bar, preferably less than 0.01 bar (10 mbar), even more preferably less than 5 mbar, even less than 2 mbar or even about 1 mbar (≈100 Pa). Superfluously it is noted that during construction of the tube section it is not necessarily in an underpressure situation.

The requirement that the centre point M of the radius of curvature R of the curved skin sections lies outside the tube section has the effect that when the section is used in an ETT-system and there is an external pressure on the tube section that the curved skin sections are pushed inwardly and that the curved skin sections are stressed in tension between the longitudinal stringers (see FIG. 10). Due to its construction with the inwardly curved thin-walled skin sections according to the invention M lies outside the tube section if the tube section is used in an underpressure application, but also if the tube section is not (yet) in an underpressure application.

The invention allows individual tube sections to be made before assembling into a complete tube. The complete tube offers a hot rolled strip steel and tubular section solution. It is a concept which can produce large diameter tubes (from the smallest Hyperloop Alpha tube size 2.23 m internal diameter equivalent and larger). This design uses less material than the equivalent single gauge walled tube whilst achieving the same buckling performance under an external pressure with acceptable vertical stiffness between supporting pylons.

A tube for an ETT-system needs to maintain a near vacuum internally and a stable straight support structure. The two key functional requirements related hereto are resistance to buckling and vertical stiffness (i.e. resistance to sagging between subsequent supports, such as the aforementioned pylons). The tube, being under external pressure, could be prone to buckling in 2 ways. Firstly, there could be a global buckling failure, where the whole tube section collapses, typically with shapes made up with half sine waves the length of the tube and with maximum displacement at the mid span of the tube. The second potential buckling failure mode is a local mode where small sections of the tube fail. The design of the tube addresses the vertical stiffness, global and local modes allowing for tuning each while generating a lightweight design.

The design consists of a conceptual skeletal frame and a skin made from skin sections. The skeletal frame consists of longitudinal sections described here as stringers and circumferential sections described here as ribs or rings. Both the ribs or rings and stringers can be made from standard square or rectangular hollow tubes or sections. These types of tubes are generally referred to as rectangular hollow sections (RHS). The sections may also be conventional sections or profiles such as ⊥, [ ], ⌈ ⌉, I or T-profiles. Cylindrical tubes may also be used, but these are more problematic when connecting the stringers to the circumferential sections as the contact between the tubes and the circumferential sections is much smaller than in the case of an RHS. There may be some advantage to using unique sections for the stringers, for instance to locate the skin or helping with weld preparation, but it will be more cost effective to use standard tubes, such as Tata Steel's Celsius® range.

In the invention the stringers are mounted on the outside of the circumferential sections. The outside is defined in this respect as the side of the circumferential section which is the farthest removed from the centre point C of the section (see FIG. 7a). This means that, in use, the stringers are pressed against the outside surface of the circumferential sections as a result of the pressure difference between the inside and the outside of the tube. The connection between stringer and circumferential sections is therefore loaded in compression when the tube is used in an ETT-system.

The circumferential sections may also be produced by punching or cutting (e.g. by laser cutting) the sections from a flat metal strip, preferably a steel strip. This method gives the designer more freedom in choice of shape, such that for instance a circumferential sections may be produced with a circular opening to allow the capsule to pass through the tube section, and an outer circumference comprising a plurality of recesses to receive the stringers that allow precise positioning of the stringers and also provide additional support to the skin sections between the recesses. FIG. 11 shows this schematically. It is economical to produce these circumferential sections in two or more parts to prevent excessive generation of scrap material and connect (e.g. weld) the parts together on site. This also solves any road transport problem. When using these circumferential sections the outside (4a) is defined in this respect as the recesses to receive the stringers (see FIG. 11).

The skins sections are straight along the length of the skin section, and have an essentially constant arc over the width of the skin section which, when attached to the stringer in the tube section, has the middle of the arc pointing towards the centre point of the tube, or in other words, the centre-point of the arc lies outside the tube section. This means that under an external pressure the skin sections are nominally put into tension between the stringers, not into compression. Ideally there is no tension in the skin section in the direction parallel to the stringers. The term "in use" in the context of this invention therefore implies a pressure difference between the outside and the inside of the tube section, where the atmospheric pressure on the outside is (much) higher than the pressure in the tube section. FIG. 10 shows this schematically.

More than half of the tube weight is associated with the skin and the skin gauge has a big influence on buckling performance. By designing the tube such that the skin is predominantly in tension it is less prone to buckling; a phenomenon associated with compressive loading. Increasing the concavity reduces the skins contribution to the vertical stiffness. Increasing the stringer section increases stiffness and mass. The location of the rings can be biased towards the mid span to have a larger effect on the global modes. An embodiment of the design has straight sections or ribs between the stringers, so that the ring is an n-sided polygonal. However, this is not as effective as a curved circumferential ring because the distance from the tube axis to the middle of the ribs is shorter, providing less resistance to global buckling. It is therefore preferable that the circumferential rings have a curved shape, such as a circular, oval or elliptic shape.

The length of a tube section is not fixed. Typically, the length is between 10 and 50 m. The Hyperloop concept study assumes length of 30 m to be feasible. Such a length can be transported through air, train or on a lorry. For ETT applications the diameter of the incircle in the tube section is preferably at least 3 m. A suitable upper boundary for this diameter is 5 m, although this is not a limitation per se. If the tube section is strong and stiff enough, diameters of larger than 5 m are conceivable without deviating from the gist of the invention as claimed. Also, the tube is not necessarily circular in cross sections. The tube may also be oval, or any other suitable shape.

Due to the volumes involved with a tube for an ETT-system, it is intended to make the tube from hollow tubes and hot rolled strip. By limiting the design to strip up to 1600 mm wide, the material could be sourced from most mills. This will influence the maximum span of the skin sections. Adding more sections adds extra stringers which may help with vertical stiffness but adds assembly weld length which adds additional costs.

For manufacture and assembly, it is envisaged that the skeletal frame will be assembled first and the skin then welded to it. The skin sections may have the same length as the tube section, or the skin sections may have a different length. In that case there may be a need to connect skin sections along the short edges of the skin sections.

The circumferential sections could be made as an extra process at the end of the hot rolled tube line. During the rectangular hollow section (RHS) manufacture, an extra station added at the end would bend the tube into a very shallow spiral at the correct diameter. This spiral would then be cut at 1 complete revolution. This single turn spiral then just needs a little lateral manipulation to make a complete, circular ring. By this method, the ring would have minimal built in stress from being turned into a ring. This production of the circumferential sections could also be performed on the building site of the tube sections, e.g. by a mobile unit able to produce the circumferential sections from straight sections. These long lengths of straight sections could be delivered to the site on a truck, train or otherwise over the road, in the same way as the stringers.

The skin could be roll formed and/or made on a transfer press. Long straight uninterrupted welds on the skin may allow easy facilitation of robotic welding.

The skin-sections, together with the longitudinal stringers to which the skin-sections are attached, preferably by welding, along their long edges, form the airtight skin and, with the assistance of the longitudinal stringers, resist the external pressure. The fact that the skin sections are provided with a curve means that the stress in the skin sections is a tensile stress, i.e. the skin sections are loaded in tension when the pressure in the tube is lower than outside. The skin sections are pressed inwardly by the pressure difference and since the skin sections are fixed on both long edges to the stringers the pressure exerted on the skin sections causes the tensile stress in the sections running between the stringers. This wall structure of skin sections loaded in tension and the stringers in combination with the circumferential sections acts to resist the global buckling modes. If there is no difference in pressure on the inside and outside of the tube section, there is no or substantially no tensile stress in the wall sections, apart from any residual stresses that may be present in the wall sections as a result of their production, e.g. by roll-forming, pressing, bending or similar processes. It is noted that if the pressure in the tube section would be higher than outside the tube section, then the skin section would be loaded in compression and a compressive stress state would occur in the skin sections between the stringers. At very high pressures differences this could eventually lead to a complete and undesired reversal of the curvature by flipping outwardly.

The skin sections are preferably thin-walled to enable the tube section to be constructed as lightly as possible. Preferably the thickness of the wall section is between 1 to 10 mm, more preferably at most 8 mm, even more preferably at most 6 mm.

It is remarked that the tube section according to the invention is therefore between the longitudinal stringers a single skin tube section wherein the curved skin sections between the longitudinal stringers form the only partition between the low pressure inside and the atmospheric pressure outside the tube section. In other words: in use, the curved skin sections together with the longitudinal stringers form the partition between the low pressure inside the tube section and the atmospheric pressure outside the tube section. The circumferential sections are not part of this partition, but they support the stringers and the curved skin section from inside the tube section.

A large weight reduction is achieved by the tube section according to the invention. Compared to the flat spiral welded strip the same buckling strength can be obtained with the tube section according to the invention wherein the tube section according to the invention would be 3 times as light as the equivalent tube section from flat spiral welded strip.

The tube section according to the invention comprises an airtight tube with an incircle of at least 2 m diameter. It is a concept which can produce small and large diameter tubes (from the smallest Hyperloop Alpha tube size 2.23 m internal diameter equivalent and larger). This design uses less material than the equivalent single gauge walled tube whilst achieving the same external pressure buckling performance with acceptable vertical stiffness between supporting pylons and has other benefits. Preferably the diameter of the incircle of the tube section, and thus the tube produced from combining the tube sections, is at least 2 m, more preferably at least 3 m, even more preferably at least 4 m. A suitable upper boundary for this diameter is 5 m, although this is not a limitation per se. If the tube section is strong and stiff enough, diameters of larger than 5 m are conceivable without deviating from the gist of the invention as claimed.

The tube section is preferably manufactured as a single wall configuration. The skin sections provide the airtightness to maintain the very low pressures inside the tube. The tube section is constructed based on a skeletal framework formed by circumferential sections and longitudinal stringers. The circumferential sections form the hoops and the longitudinal stringers form the staves. The space between the stringers is closed with the skin sections. To improve the buckling resistance and to allow to keep the skin sections as thin as possible the skin sections are provided with a curvature with a radius of curvature of R. The curvature extends along the entire length of the skin sections. This radius can be easily produced e.g. by roll forming, and this can be done on site. Preferably all tube sections are straight in the longitudinal direction, so that the stringers and the curved skin sections are straight as well along the length. Curves in the tube can be accommodated by angling straight tube sections of tube together because the curvature is very small. The track can be curved within the tube itself. For a larger curvature, e.g. if absolutely required, reduced lengths of the straight tube sections can be used to achieve greater curvature.

The longitudinal stringers are connected to the outer surface of the circumferential sections. The outer surface is defined as seen from inside the tube section. The stringers are mounted to the circumferential sections substantially equidistantly around the circumferential sections so as to form a skeletal framework for attaching the skin section to. The long edges of the curved skin sections are mounted air-tightly to the longitudinal stringers, preferably to the outer surface of the longitudinal stringers. Preferably the skin sections are fixedly mounted to the stringers, for example by welding or with fastening means. The centre point (M) of the radius of curvature (R) of the curved skin sections (5) lies outside the tube section irrespective of whether the tube section is in use in an underpressure application or not (yet).

As explained herein above, when the pressure in the tube section is much lower than outside the tube section, the skin sections are in a state of tension between the stringers. This situation occurs when the tube section is in use in an ETT-system. The pressure difference presses the skin sections inwardly and may ultimately even touch the circumferential sections. The circumferential sections thus prevent the skin sections from further bulging inwardly.

The tube section thus produced has enough rigidity to be handled by cranes or the like and be mounted on pylons or other supporting structures. The skeletal framework provides this rigidity. The skin sections provide the airtightness.

In an embodiment one, more or all of the longitudinal stringers are hollow tubes. These can be round tubes, oval tubes or polygonal tubes. However, it is a preferable embodiment that the longitudinal stringers are rectangular or square tubes, such as the Tata Steels Celsius®-range, as these have flat edges which makes them more suitable to connect to the longitudinal stringers and the skin sections. These rectangular tubes also provide some additional stiffness.

In an embodiment one, more or all one, more or all of the circumferential sections (4) are hollow rectangular tubes. These tubes have adequate rigidity and have a higher resistance to buckling. Preferably the longitudinal stringers are rectangular or square tubes, such as the Tata Steels Celsius®-range, as these have flat edges which makes them more suitable to connect to the longitudinal stringers.

Although it is preferable that the curved skin sections have enough strength of themselves by choosing an adequate combination of curvature and thickness after being connected along its longitudinal edges to the longitudinal stringers, it is, in another embodiment, provided with additional strengthening elements. These additional strengthening elements are preferably parallel to the short edges of the section and may consist of separate elements fixed to the skin section, or by strengthening the skin sections itself by means of inwardly or outwardly oriented intrusions such as dimples or the like. Patterns embossed on the skins help to increase the local panel buckling performance. The strengthening elements against local buckling can be intruding or protruding reinforcements in the surface of the skin sections. Intruding means that the dimples locally reduce the internal diameter of the tube section and are therefore referred to as inwardly oriented dimples. Protruding means that the dimples locally increase the internal diameter of the tube section and are therefore referred to as outwardly oriented dimples. The dimples are preferably intruding reinforcements. The shape of the dimples is not particularly restrictive, but it is advantageous to provide the dimples in a regular pattern. This regularity provides the strip with a predictable behaviour, and the dimples can be applied by means of a technology like roll forming or pressing. The depth of the dimples can be tailored to the specific case.

In its simplest form the circumferential sections are spaced equidistantly along the length of the longitudinal sections of the tube section. By means of a non-limiting example: for a tube section length having a length (L) of 30 m, if 11 circumferential sections are used, then the distance between all sections is 3 m, with a circumferential section at either end. However, in an embodiment the distance between the circumferential sections varies along the longitudinal section. In a preferred embodiment the distance between the circumferential sections is smallest at ½ L, and largest at both extremities. The distance would be varied to optimize the buckling resistance of the tube section.

It should be noted that the circumferential sections at both ends may be the same circumferential sections as those used elsewhere in the skeletal framework, or they may be specific circumferential sections with a connecting function that allow linking two adjacent tube sections together. By means of example, these specific circumferential sections may comprise two circumferential sections welded together to obtain a ring with double the width of the other circumferential sections, or the connecting function may include an expansion joint to allow for changes in length as a result of (e.g.) temperature changes.

Although the simplest form of the circumferential sections is circular, the circumferential sections may also have an oval or elliptic shape, which may have a particular relevance for switches where two tubes meet to continue as one. Circular, oval or elliptic cross sections can, for instance, be produced by bending tubes in a spiral form immediately after production. By cutting the spiral and welding the ends together closed circular, oval or elliptic circumferential sections can be produced.

In an embodiment the circumferential sections have a polygonal shape rather than circular, oval or elliptic. Although the number of sides could be as little as 3, a number of 6 or 7 could be used. However, for practical reasons the polygon preferably has at least 8 sides. Such polygonal circumferential sections could be produced by welding together straight tubes.

All elements, the longitudinal stringers, the circumferential sections and the skin sections are preferably produced from hot-rolled steel strip. The steel strip may be as-hot-rolled, optionally galvanized and/or organically coated, or cold-rolled, annealed and optionally galvanized and/or organically coated. The as-rolled or as-coated steel strip is usually provided in the form of a coiled steel strip. If the skin sections are produced on site using a mobile production facility directly from coiled strip, and subsequently assembling the tube section on site also solves transport problems, because transporting coils is not a problem.

In an embodiment the number of longitudinal stringers along the circumferential sections is a prime number, e.g. 11 longitudinal stringers. The inventor found that having a prime number of longitudinal stringers has a beneficial effect on the buckling resistance because for global modes there is no repeat divisible pattern mode shape possible.

In an embodiment one or more, but not all, preferably less than one third of the panels, of the skin sections is a skin section with added functionality such as a flat skin section, e.g. a floor panel, or an installation panel for peripherals. These peripherals may be the electric rails, lighting or other installation parts needed for allowing the tube section to function as a part of an ETT-system. Also, sections could be provided with hatches for emergency escape, or for access during the Hyperloop assembly. As a floor there may be a need for only a light imprint to the inner panels, or no imprint requiring a thicker gauge, or a non-slip checker plate type pattern. It may be easier to install access and escape hatches to the sections before they are assembled. Extensions to the stringers could also be used to mount accessories such as the pod guide rails in an ETT-system. The EU-pod rails could be mounted directly to/from the stringers, potentially requiring stringers of different size or gauge if required.

The peripherals may also be mounted using the stringers and/or the circumferential sections as these are accessible from inside the tube.

The invention is also embodied in an evacuated tube transport system tube comprising a plurality of tube sections according to the invention wherein the pressure outside the tube is the atmospheric pressure and wherein the pressure inside the tube is less than 0.1 bar, preferably less than 0.01 bar (10 mbar), even more preferably less than 5 mbar or even 2 mbar. In applications aboveground, the pressure outside the tube is the atmospheric pressure of about 1 bar. The individual completed tube sections can be combined to form a continuous tube to form part of an ETT-system. Such a tube benefits from the high buckling resistance, despite the skin sections and the relatively open skeletal frame that functions as a backbone for the tube. The adjacent tube sections can be connected using a connecting ring, which may also function as an expansion joint. The tube for an underpressure application, such as an ETT-system, is divided into tube sections of a manageable size. The tube section is fixedly connected to other tube sections to form the tube (see FIG. 9). The connection between the tube sections must be airtight to allow a low pressure to exist in the tube. This airtightness may be provided by the connection itself, i.e. because of welding, or by some compound between the tube sections, such as an elastomer, when the tube sections are bolted or clamped together, or by means of an expansion joint to deal with thermal expansion of the tube sections.

An added advantage of the skeletal frame is that it can also serve as a base for mounting peripherals on the outside of the tube section or tube. For instance, photovoltaic means such as solar panels could be mounted on the tube, and preferably on top of the tube. Also, with the tube expected to be largely suspended high in the air from pylons, one of the most likely forms of damage will be from tall trees or telegraph poles striking the tube. Compared to other designs for ETT tubes, with the external skeletal frame, superior protection is provided.

The tube section according to the invention is suitable for constructing an evacuated tube transport system. However, the specific properties of the tube section, and its ability to perform under conditions wherein the pressure exerted on it from outside the tube produced from these tube sections is significantly higher than the pressure in the tube make it also suitable for the application of tubes operating under similar pressure conditions. Examples of these applications are underground or underwater tunnels for traffic such as bicycle tunnels, car tunnels, train tunnels, maintenance tunnels or shafts, tubes in hydro-electric power stations, gas storage systems in which underpressure occurs or may occur, etc.

BRIEF DESCRIPTION OF THE DRAWINGS

The invention will now be further explained by means of the following, non-limitative drawings. The dimensions mentioned below are indicative, but not limitative.

The pressure difference presses the skin sections inwardly and may ultimately even touch the circumferential sections. This is visible in FIG. 4 by the small pairs of stripes on the skin sections.

Figure 1:
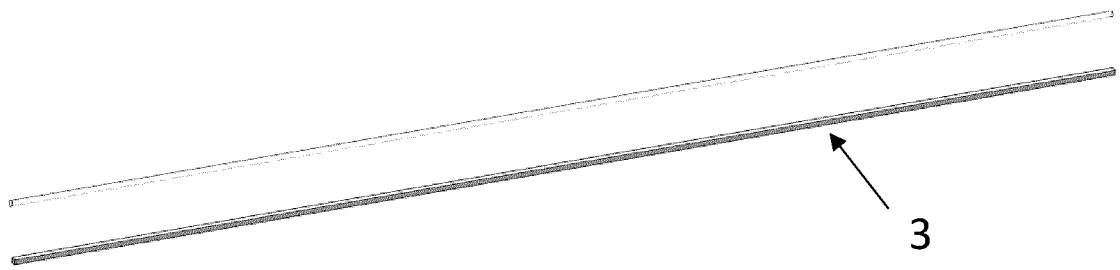
FIG. 1 shows two longitudinal stringers made of 5 mm thick square 140×140 $mm^2$ hollow sections. In this example the length L is 30 m. As mentioned herein above, the stringers may also be other types of sections or profiles. The principle stays the same.
Figure 2:
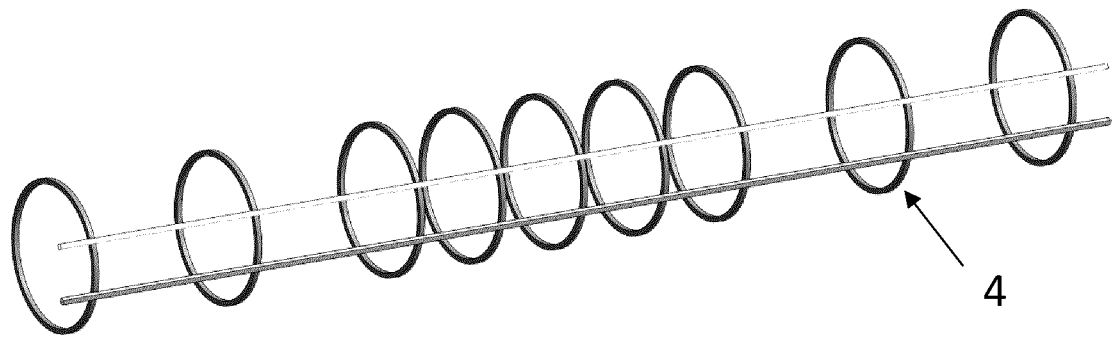
FIG. 2 shows the longitudinal stringers of FIG. 1 together with 9 circumferential, in this example circular, sections. Sections are 120×80 $mm^2$ rectangular hollow sections with a wall thickness of 6.3 mm. As mentioned herein above, the circumferential sections may also be other types of sections or profiles, and they do not necessarily have to be circular. They may be oval, ellipsoid or the like. The principle stays the same.
Figure 3:
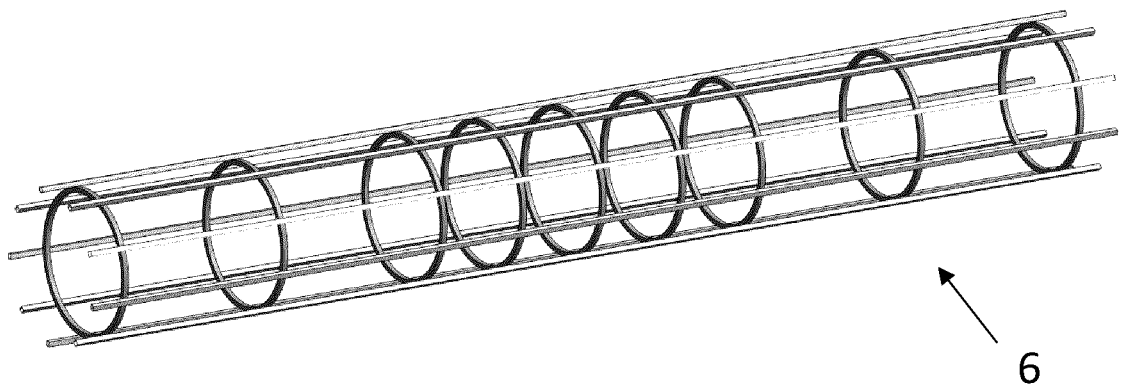
FIG. 3 shows the skeletal framework of a tube section formed by the longitudinal stringers and the circumferential sections. The circumferential sections at the end of the framework, e.g. for connecting the finished tube section to an adjacent tube section, have been left out for clarity. As explained above, these circumferential sections may be the same as the other circumferential sections or they may be specifically tailored for connecting two adjacent tube sections.
Figure 4:
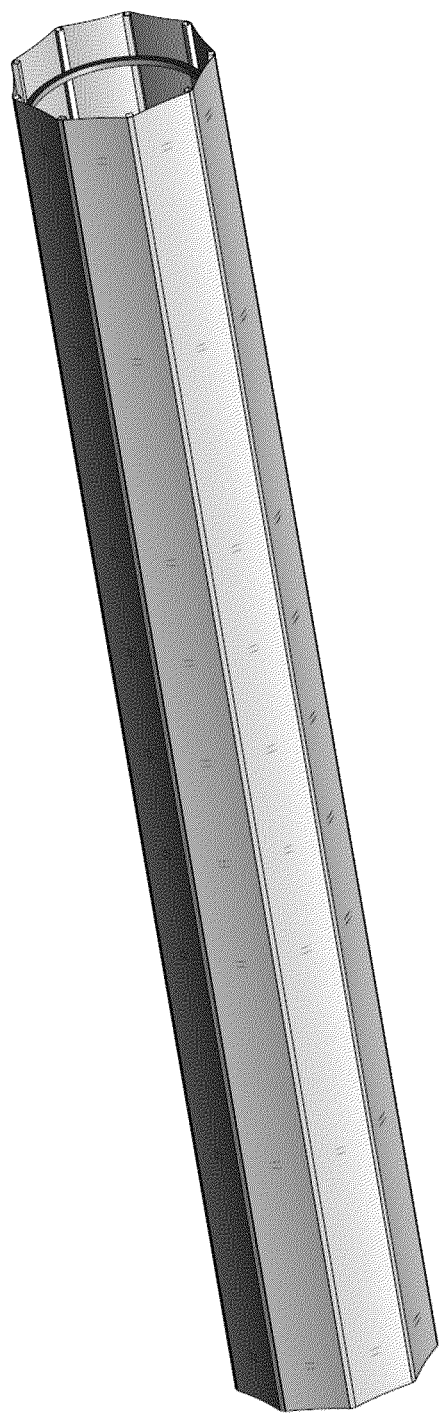
FIG. 4 shows the completed tube section, without the circumferential sections at both ends. In use, when the pressure in the tube is much lower than outside, a tensile stress is present in the skin sections between the stringers.
Figure 5:
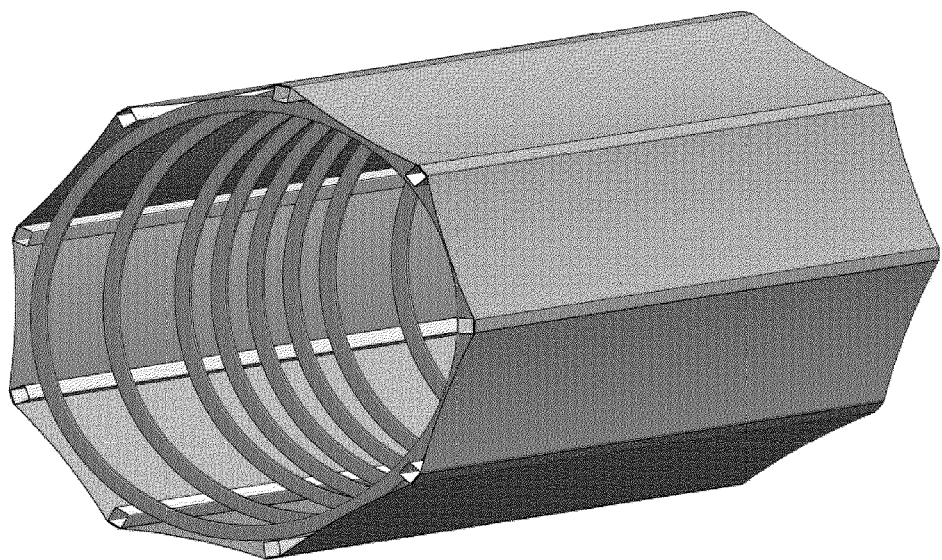

FIG. 5 shows the skin section of FIG. 4 fixed onto the framework of FIG. 3. The connection between the longitudinal stringers and long edges of the skin section is airtight, and the connection is preferably made by welding (such as laser welding, laser hybrid welding, gas metal arc welding, or any other suitable form of welding).

Figure 6:
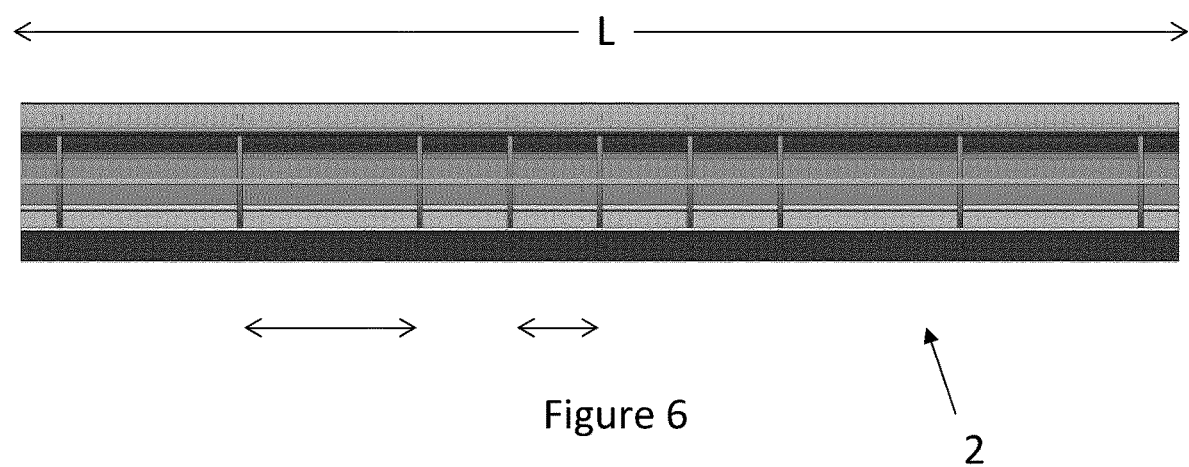

FIG. 6 shows the completed tube section, (in a see-through representation) as seen from the side, which clearly shows that the distance between the circumferential sections is different in the middle of the tube section compared to the ends. The tube in this example is sized to give an internal cross-sectional area equivalent to a 4.5 m diameter tube.

Figure 7A:
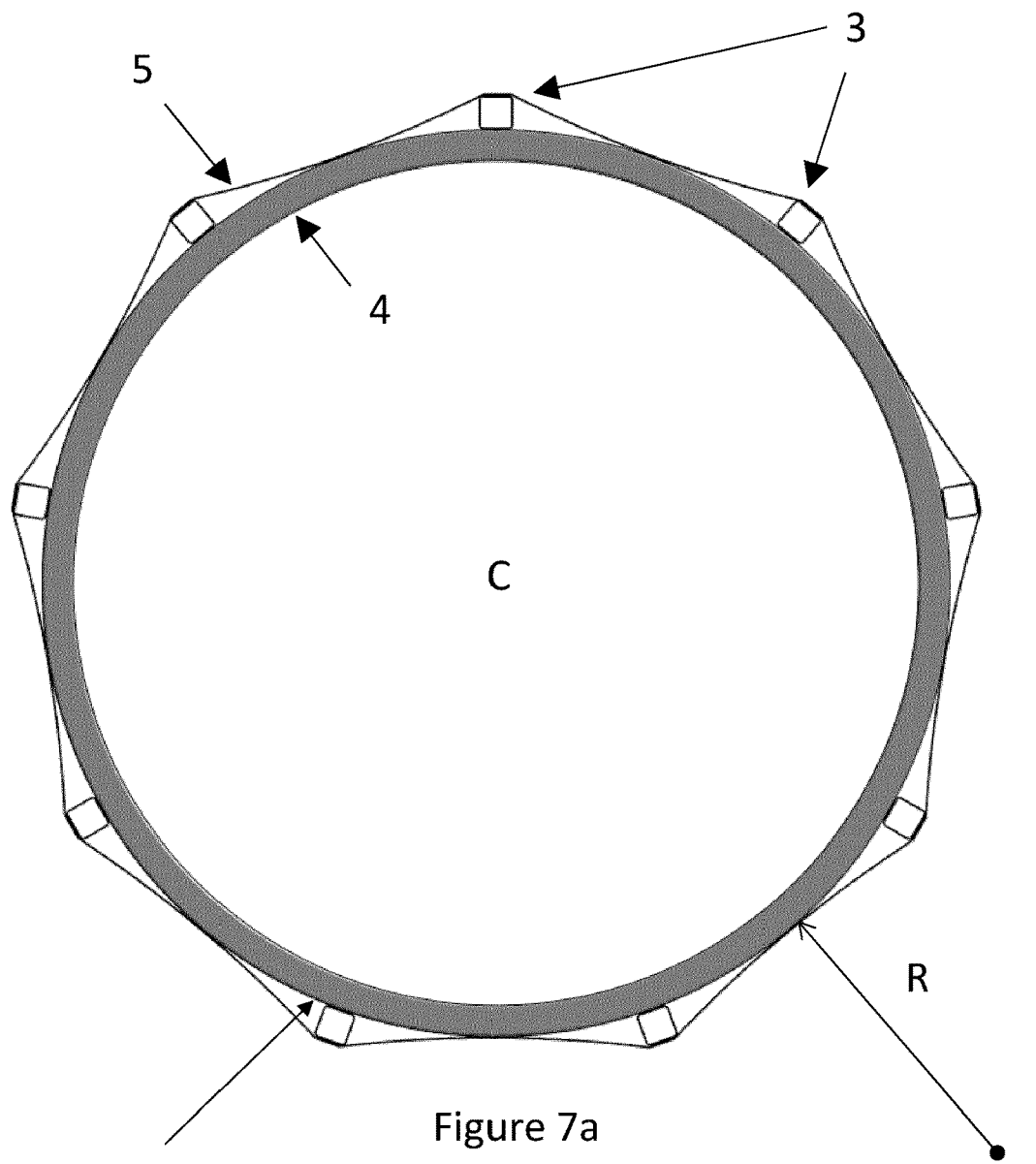
Figure 7B:
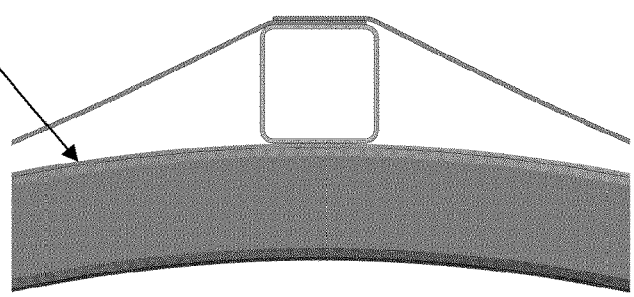

FIGS. 7a and 7b show a cross section of the tube section, highlighting the three main elements: the longitudinal stringers 3, the circumferential section 4 and the skin sections 5. It is clearly shown that an edge of the stringer is fixed, e.g. by welding, to the outside (outside as seen from within the tube section) surface of the circumferential section. Also, it is shown that the edges of the skin section are fixed to the stringer, e.g. by welding. In this example, the edge of a skin section is fixed to the stringer while overlapping the edge of the adjacent skin section. The curvature of the skin section is indicated by means of the radius R and centre point M. It is deemed important that the centre point M lies outside the tube section. If the centre point lies inside the tube section, then the skin sections are not loaded in tension between the stringers when the pressure in the tube section is reduced, but in compression, which is disadvantageous for the buckling resistance.

Figure 8A:
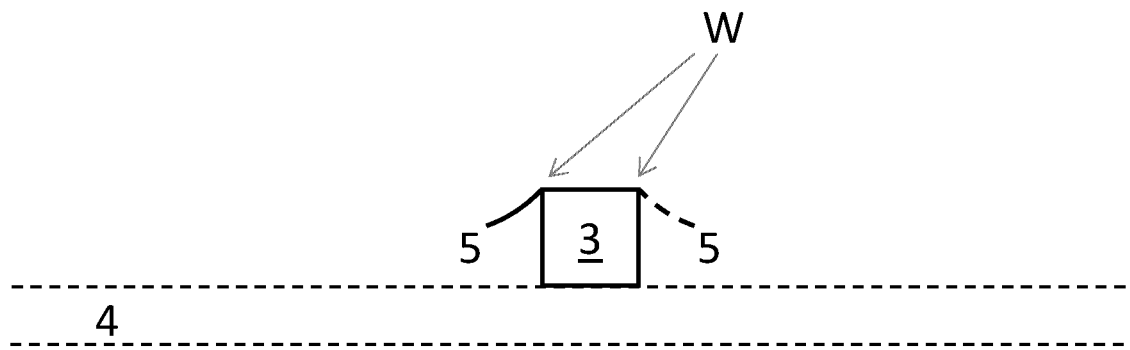
Figure 8B:
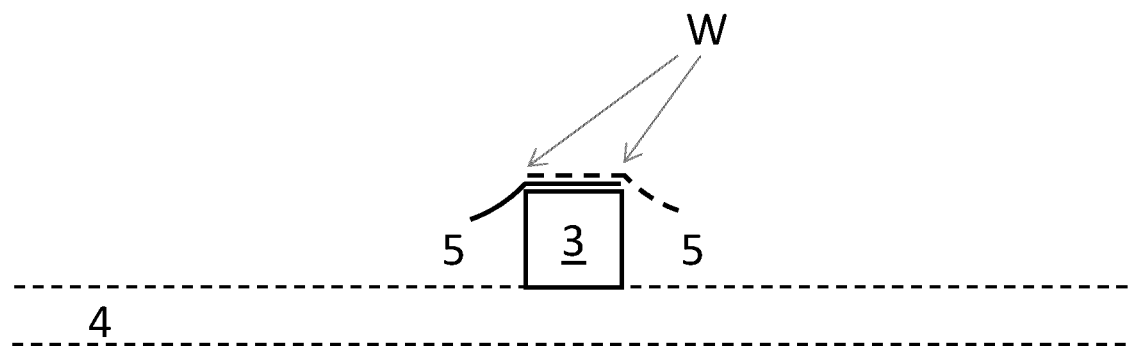
Figure 8C:
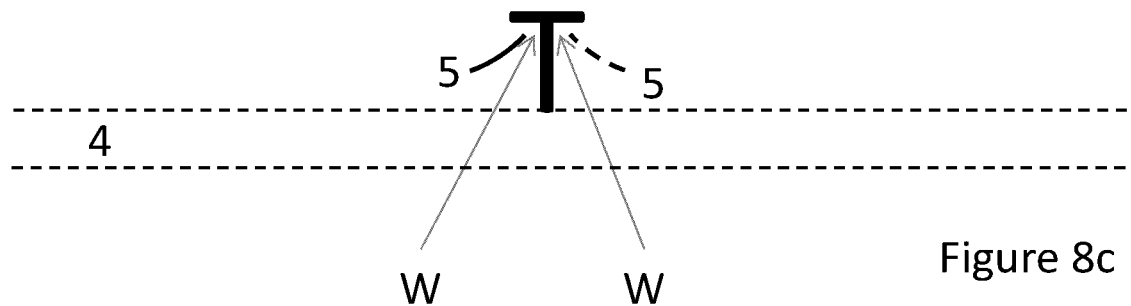

FIGS. 8a, b and c show three variants of the many possible variants to attach the skin sections to the stringers. In FIG. 8a the edges of the skin sections are attached to a corner of the stringer. In FIG. 8b the edges are provided with a flat flange that are welded to the outside surface of the stringer in an overlap. FIG. 8c shows a variant with a stringer in the shape of a T-section wherein the skin sections are welded to the T-section in the corner of the T on both sides. The indication of the weld W is indicative and may be applied from the top or the bottom of the skin sections.

Figure 9:
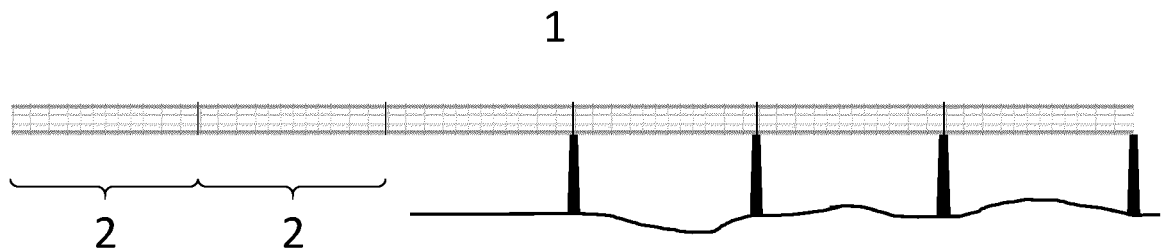

FIG. 9 shows a part of an evacuated tube transport system tube (1) comprising a plurality of tube sections (2) in an aboveground application wherein the pressure outside the tube is the atmospheric pressure and wherein the pressure inside the tube is less than 0.1 bar. The tube is supported e.g. by pylons (schematically drawn only on the right-hand side).

Figure 10:
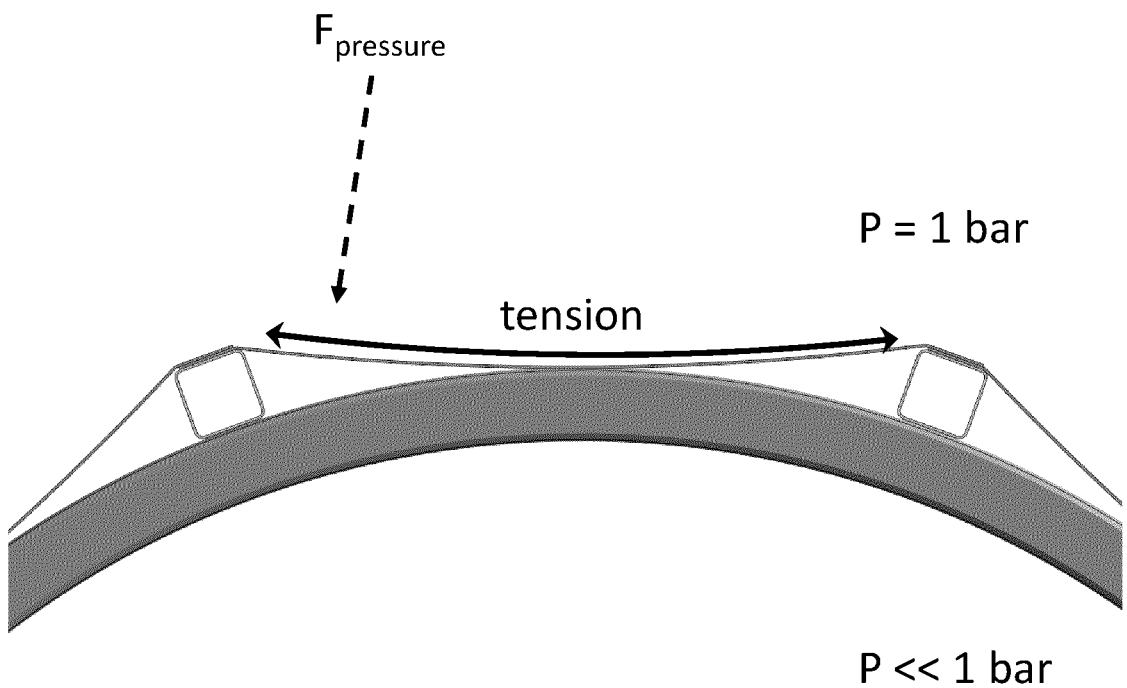

FIG. 10 shows the situation where the tube (1) is subjected to a pressure difference ($P_{outside}$=1 bar, $P_{inside}$=(much) lower than 1 bar). Depending on the pressure difference $P_{outside}-P_{inside}$ the force ($F_{pressure}$) exerted on the skin panels increases. The higher this force, the higher the tension stress in the skin panel between the stringers to which the skin panel is attached. The force exerted on the skin panels only causes a tension stress in the direction between the stringers. As soon as the pressure difference is zero, the $F_{pressure}$ also becomes zero. So there is only a tensile stress in the skin panels if there is a pressure difference between the outside and the inside of the tube, which is the case in all underpressure applications. During construction of the tube section and during construction of the tube comprising a plurality of tube sections, there is no tension in the skin panels as long as there is no pressure difference between the outside and the inside of the tube.

Figure 11:
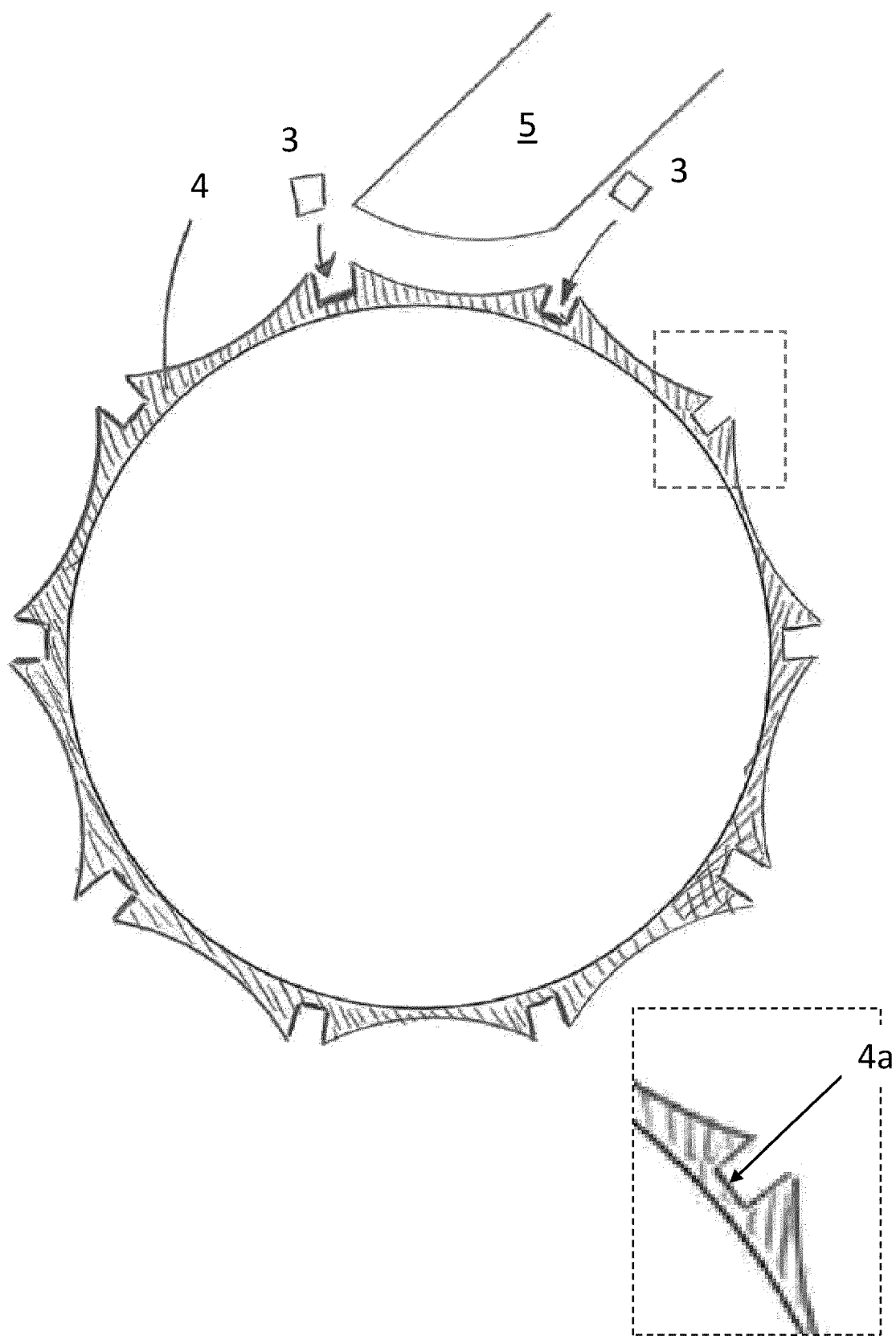

FIG. 11 shows a schematic drawing of a circumferential section 4 that can be produced by cutting, punching or stamping out of flat steel sheet and that is provided with a plurality of recesses to receive the stringers 3, and a shaped curve between the recesses to optionally support the skin sections 5 when these are fixed to the stringers when loaded in tension during use of the tube.

Figure 12:
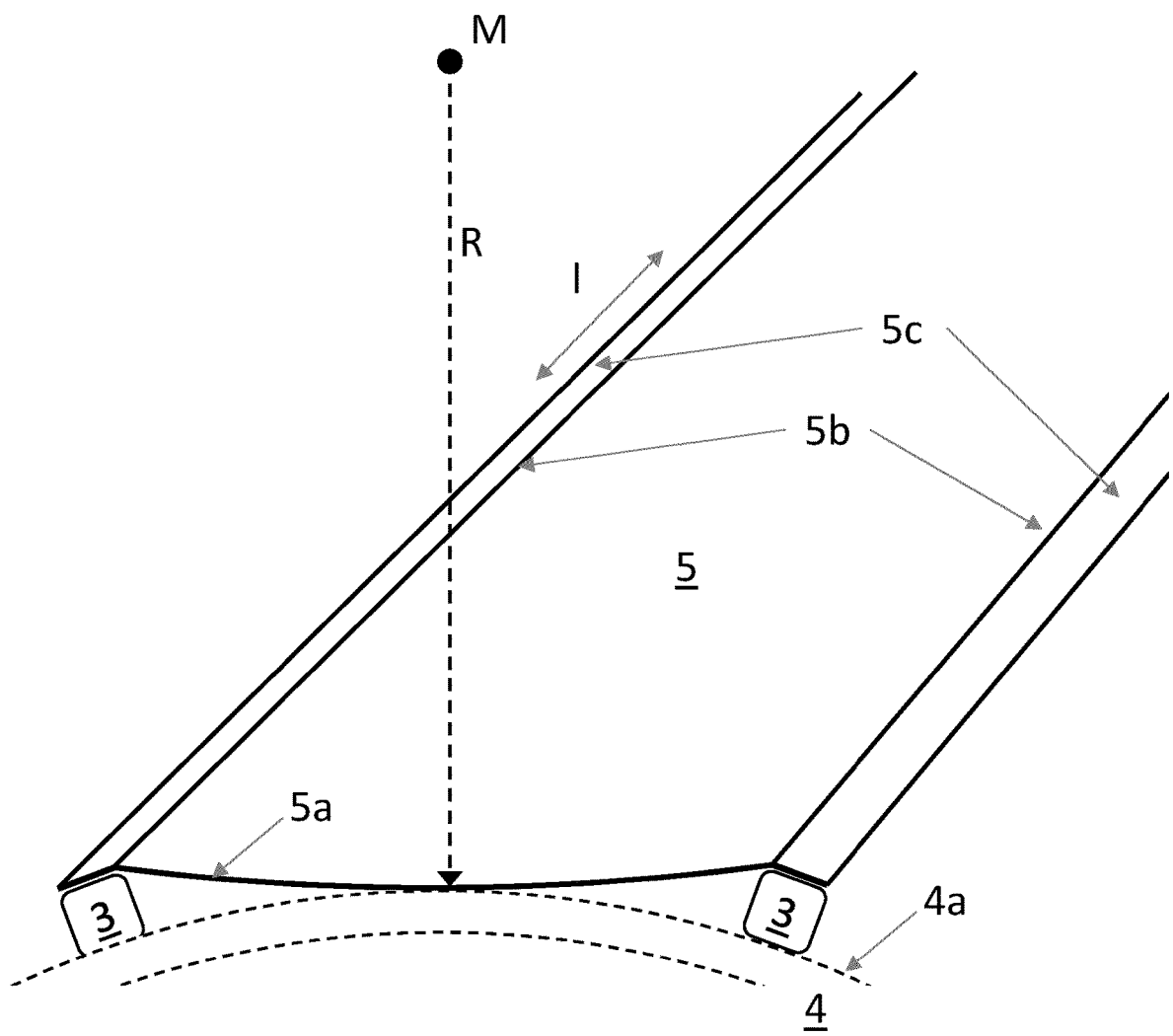

FIG. 12 shows a schematic drawing of the skin section 5. The skin section has a length l and a width w. Along its length it is curved having a radius of curvature R and the curvature extends along the entire length. The short edges (5a) are therefore provided with said curvature and the long edges are substantially straight, as they will be airtightly connected to the longitudinal stringers 3. One or both of the long edges 5b of a skin section may be provided with a flange 5c that enables the connection to the longitudinal stringers, for example as shown in FIG. 8a or b where the flanges are provided on both sides and are substantially flat. The desired shape of the flange and the need of a flange depends on the choice of construction of the longitudinal stringers and on the choice of connection of the skin section to the stringer, and the proper choice lies well within the skills and abilities of the relevant skilled person.

The invention claimed is:

1. A tube section, having a length L, for constructing a tube suitable for underpressure applications, with an incircle having a diameter of at least 2 m,
    wherein the tube section comprises a plurality of longitudinal stringers, a plurality of circumferential sections and a plurality of skin sections having a radius of curvature R and wherein the curvature extends along the entire length of the skin sections,
    wherein the longitudinal stringers are connected to the outer surface of the circumferential sections, wherein the plurality of longitudinal stringers are mounted to the circumferential sections to form a skeletal framework for attaching the skin sections,
    wherein long edges of the skin sections are mounted air-tightly to the longitudinal stringers, and
    wherein a centre point M of the radius of curvature R of the skin sections lies outside the tube section and wherein, the skin sections are adapted and configured such that during a state of an underpressure application, the skin sections between the longitudinal stringers are loaded in tension between the longitudinal stringers.

2. The tube section according to claim 1, wherein i) at least one of the longitudinal stringers are hollow, and/or wherein ii) at least one of the circumferential sections are hollow.

3. The tube section according to claim 1, wherein the distance between the circumferential sections is smaller towards a middle of the tube section at ½ L than at both extremities of the tube section.

4. The tube section according to claim 1, wherein at least one of the circumferential sections have a curved shape.

5. The tube section according to claim 1, wherein at least one of the circumferential sections are polygons with at least 8 sides.

6. The tube section according to claim 1, wherein at least one of the longitudinal stringers are produced from a rectangular tube.

7. The tube section according to claim 1, wherein at least one of the circumferential section are produced from a rectangular tube.

8. The tube section according to claim 1, wherein at least one of the longitudinal stringers and/or wherein at least one of the circumferential sections and/or wherein at least one of the skin sections are produced from hot-rolled steel strip.

9. The tube section according to claim 1, wherein the number of longitudinal stringers along the circumferential sections is a prime number.

10. The tube section according to claim 1, wherein at least one of the skin sections, but less than one third, of the skin sections is a flat skin section.

11. The tube section according to claim 1, wherein photovoltaic means such as solar panels are provided on the tube section.

12. The tube section according to claim 1, wherein, during the state of the underpressure application, the curved skin sections are in direct contact with the circumferential sections.

13. The tube section according to claim 1, wherein, during the state of the underpressure application in use the curved skin sections together with the longitudinal stringers form the partition between the low pressure inside the tube section and the atmospheric pressure outside the tube section.

14. An evacuated tube transport system tube comprising a plurality of tube sections according to claim 1, wherein, during the state of the underpressure application, the pressure inside the tube is less than 0.1 bar.

15. The evacuated tube transport system tube according to claim 14, wherein two or more adjacent tube sections are connected by means of an expansion joint.

16. A method of use of the tube sections according to claim 1 in an evacuated tube transport system tube comprising applying the state of underpressure to the evacuated tube transport system tube, wherein, during the state of the underpressure application, the pressure inside the tube is less than 0.1 bar.

17. The method of use according to claim 16, wherein the pressure inside the tube is less than 0.01 bar.

18. The tube section according to claim 1, wherein at least one of the circumferential sections have a circular, oval or elliptic shape.

19. The tube section according to claim 1, wherein at least one of the skin sections, but less than one third, of the skin sections is a floor panel, or an installation panel for peripherals.

20. The tube section according to claim 1, wherein photovoltaic means such as solar panels are provided on top of the tube section.

* * * * *